US012749937B2

(12) United States Patent
Sever

(10) Patent No.: US 12,749,937 B2
(45) Date of Patent: Sep. 29, 2026

(54) STATOR FOR AN ELECTRIC MACHINE, PRODUCTION METHOD FOR SUCH A STATOR IN AN ELECTRIC MACHINE

(71) Applicant: MAHLE International GmbH, Stuttgart (DE)

(72) Inventor: Peter Sever, Murska Sobota (SI)

(73) Assignee: Mahle International GmbH (DE)

( * ) Notice: Subject to any disclaimer, the term of this patent is extended or adjusted under 35 U.S.C. 154(b) by 224 days.

(21) Appl. No.: 18/833,388

(22) PCT Filed: Jan. 11, 2023

(86) PCT No.: PCT/EP2023/050562
§ 371 (c)(1),
(2) Date: Jul. 25, 2024

(87) PCT Pub. No.: WO2023/143915
PCT Pub. Date: Aug. 3, 2023

(65) Prior Publication Data

US 2025/0141292 A1 May 1, 2025

(30) Foreign Application Priority Data

Jan. 27, 2022 (EP) .................................... 22153590

(51) Int. Cl.
*H02K 3/24* (2006.01)
*H02K 3/50* (2006.01)
(Continued)

(52) U.S. Cl.
CPC ................. *H02K 3/24* (2013.01); *H02K 3/50* (2013.01); *H02K 15/12* (2013.01); *H02K 15/32* (2025.01); *H02K 2203/09* (2013.01)

(58) Field of Classification Search
CPC .. H02K 3/30; H02K 3/32; H02K 3/38; H02K 3/24; H02K 1/20; H02K 15/12; H02K 15/122
(Continued)

(56) References Cited

U.S. PATENT DOCUMENTS

| | | | | |
|---|---|---|---|---|
| 2,763,798 A * | 9/1956 | Kriss | H02K 3/32 | 29/605 |
| 4,128,527 A * | 12/1978 | Kinjo | H02K 3/30 | 310/43 |

(Continued)

FOREIGN PATENT DOCUMENTS

| | | |
|---|---|---|
| DE | 102017221808 A1 | 6/2019 |
| EP | 2608366 A2 | 6/2013 |

(Continued)

OTHER PUBLICATIONS

EP Search Report for EP-22153590.9, dated Aug. 1, 2022.
PCT Search Report for PCT/EP2023/050562, dated Feb. 15, 2023.

*Primary Examiner* — Christopher M Koehler
*Assistant Examiner* — Ahmed F Seck
(74) *Attorney, Agent, or Firm* — Fishman Stewart PLLC

(57) ABSTRACT

A stator for an electric machine may include a ring-shaped stator body defining a longitudinal centre axis, a plurality of electrically conductive stator windings fixed radially internally on the stator body with respect to the longitudinal centre axis, and a plurality of radial cooling apertures through which coolant is flowable. The stator windings may be encased by a plastic injection moulded body. The stator windings may project on both sides with respect to the longitudinal centre axis axially beyond the stator body such that the stator body is flanked axially on a first side by a ring-shaped first axial overhang and on a second side by a ring-shaped second axial overhang. The cooling apertures
(Continued)

may penetrate at least one of the first axial overhang and the second axial overhang.

20 Claims, 3 Drawing Sheets

(51) Int. Cl.
*H02K 15/12* (2025.01)
*H02K 15/32* (2025.01)

(58) Field of Classification Search
USPC .......................................................... 310/65
See application file for complete search history.

(56) References Cited

U.S. PATENT DOCUMENTS

| | | | | |
|---|---|---|---|---|
| 7,587,807 | B2 * | 9/2009 | Bourqui | H02K 15/12 29/733 |
| 10,749,404 | B2 * | 8/2020 | Degner | H02K 3/525 |
| 11,527,932 | B2 | 12/2022 | Cunningham | |
| 2020/0373799 | A1 * | 11/2020 | Cunningham | H02K 5/203 |
| 2022/0029492 | A1 * | 1/2022 | Losch | H02K 3/24 |

FOREIGN PATENT DOCUMENTS

| | | | |
|---|---|---|---|
| WO | 2018189523 | A1 | 10/2018 |
| WO | 2021019058 | A1 | 2/2021 |

* cited by examiner

STATOR FOR AN ELECTRIC MACHINE, PRODUCTION METHOD FOR SUCH A STATOR IN AN ELECTRIC MACHINE

CROSS-REFERENCE TO RELATED APPLICATIONS

This application claims priority to International Patent Application No. PCT/EP2023/050562, filed on Jan. 11, 2023, and European Patent Application No. 22153590.9, filed on Jan. 27, 2022, the contents of both of which are hereby incorporated by reference in their entirety.

TECHNICAL FIELD

The invention relates to a stator, preferably a direct cooled stator, for an electric machine, well known in prior art as dry runners, where coolant (i.e. preferably mixture of water and glycol) is in direct contact with overmolded stator and wherein the stator compartment is separated away from the rotor compartment by physical barrier. The invention further relates to a production method for such a stator and the use of such a stator in an electric machine.

BACKGROUND

Generic stators for electric machines are described for example in the document DE 10 2017 221 808 A1. Such stators can indeed be cooled sufficiently well in operation, when integrated in an electric machine, however their cooling capability must be adapted when an increase in performance of the electric machine is to be realized.

SUMMARY

The object of the invention lies in providing or indicating an improved or at least a different embodiment for a stator. In particular, it is to be attempted to optimize the cooling capability of a stator, preferably by minimizing the hotspots of the stator components by means of coolant flow optimization within the area of overmolded winding head.

In the present invention, this problem is solved in particular by the subject matter of the independent claim(s). Advantageous embodiments are the subject matter of the dependent claim(s) and the description.

Preferably, the basic idea of the invention lies in providing an enhanced cooling for stator with encapsulated stator core and windings with aim to avoid issues with dielectric breakdown for high voltage machines, and to avoid corrosion of vital parts (i.e. open coper wires in area of welding points and steel plates of laminated stator core). Preferably, it can be noticed, that windings in preferred embodiment comprises hair pin design, well known from prior art, wherein the set of hairpins are welded together at least on one side of the stator core according to the required electromagnetic scheme, and wherein the windings comprises at least one busbar (i.e. star connection, and/or phase connections) for sake of achieving the required functionality of electromagnetic design for the windings. Similarly, the winding on at least one side of the stator core comprises the bus bars in function of phase connections for connecting the windings with power supply, where at least two wires of the hair pin windings are linked together. Preferably, it can be noticed, that the stator comprises the plastic material for stator encapsulation, wherein the material is applied at least with two shots of overmolding with aim to provide required thickness of the insulation material in all target areas of the stator.

Preferably, the main technical problem addressed and solved by this invention is the bulk insulating material in the areas between the wires and included busbars within overmolded material, where the hot spots are generated in the area of winding head (i.e. winding overhang on at least one side of the stator core) due to the low thermal conductivity of plastic material being used for stator encapsulation. The person skilled in the state of the art technology can understand proposed invention, where the hotspots are significantly minimized and essentially eliminated by providing the radial cooling channels and or radial apertures for flow of the coolant utilization in the area of the overmolded busbars, where the passage for coolant flow is provided between the busbars and hairpins of the stator windings.

For this, a stator for an electric machine is proposed, which has a ring-shaped stator body defining a longitudinal centre axis. Electrically conductive stator windings, extending along the longitudinal centre axis and projecting on both sides with respect to the longitudinal centre axis axially beyond the stator body, are fixed, for example injected-on, radially internally with respect to the longitudinal centre axis, in particular with respect to an inner circumferential surface of the stator body, and encased by a plastic injection moulded body. Thereby, the stator body is flanked axially on the one hand by a ring-shaped first axial overhang and on the other hand by a ring-shaped second axial overhang. It is essential that the stator has a plurality of radial cooling apertures that are able to be flowed through by coolant, which penetrate the first and/or second axial overhang. Thereby, the first and/or second axial overhang can be flowed through by coolant. In operation of an electric machine equipped with a stator according to the invention, this permits a cooling of the stator in the region of the first and/or second axial overhang, i.e. thermal energy which arises can be evacuated there in a targeted manner. The stator is therefore suitable in particular for relatively high-performance electric machines.

The stator windings of the stator can be produced from several separate wire strands bent in a u-shaped manner, which have respectively at one end two free wire ends and a bending portion at the other end. Within the mounting of the stator windings on the stator body, the wire strands can be inserted with their free wire ends ahead into the stator body so that on one side of the stator body the free wire ends, and on the other side of the stator body the bending portions of the wire strand protrude axially. The free wire ends of the inserted wire strands can then be, for example, soldered or welded to one another, so that the separate wire strands are connected in an electrically conductive manner. Subsequently, the stator windings can be injected around by the said plastic injection moulded body.

The plastic injection moulded body forming the casing of the stator windings consists here expediently of a plastic material which is suitable for injection moulding. The plastic injection moulded body can, for example, be injected onto the stator windings within an injection moulding process, so that they are encased by it, in particular completely. Thereby, an insulation effect can be achieved. Expediently, the stator windings are also injected on the stator body in a non-detachable manner, therefore fixed, by means of the plastic injection moulded body.

Expediently, the radial cooling apertures penetrate the first and/or second axial overhang completely and with respect to the longitudinal centre axis radially or in the direction of a vertical axis standing perpendicularly on the longitudinal centre axis. Thereby, the radial cooling apertures can be integrated relatively easily into the first and/or second axial overhang.

Further expediently, the radial cooling apertures penetrate the first and/or second axial overhang only in the region of the plastic injection moulded body. The stator windings are expediently not penetrated here. Thereby, the radial cooling apertures can be directed relatively closely past the stator windings, without a structural adaptation of the stator windings being necessary. This has the advantage that the transmission of thermal energy from the stator windings and/or from the plastic injection moulded body to a coolant is able to be realized relatively rapidly.

Expediently, the radial cooling apertures can be distributed in a circumferential direction around the longitudinal centre axis uniformly and/or with a uniform circumferential spacing with respect to one another in circumferential direction over the entire circumference of the first and/or second axial overhang. Thereby, the first and/or second axial overhang has radial cooling apertures distributed all around over the entire circumference. Expediently, the said circumferential spacing between immediately adjacent radial cooling apertures in circumferential direction can be predetermined. Thereby, the cooling of the first and/or second axial overhang can be improved.

Further expediently, the radial cooling apertures can be adjacent to one another in a circumferential direction around the longitudinal centre axis, wherein between two radial cooling apertures immediately adjacent in circumferential direction, a predetermined or predeterminable angle is spanned, in particular an angle of 3°, 4°, 5°, 6°, 7°, 8°, 9°, 10°, 15°, 20°, 25°, 30°, 35°, 40°, 45°, 90° or 180°. For instance, in case of stator with 54 slots, the angle is different as for 48 or 36. Hereby, also, the first and/or second axial overhang is equipped with radial cooling apertures distributed all round over the entire circumference. However, an angle is defined or respectively predeterminable between two immediately adjacent radial cooling apertures in circumferential direction. Thereby, for example, a preferred circumferential spacing can be set relatively easily between the radial cooling apertures. Expediently, a corresponding angle can be determined between a centre axis of the one radial cooling aperture and a further centre axis of a further radial cooling aperture immediately adjacent in circumferential direction.

It is expedient, furthermore, if the radial cooling apertures in the first and/or second axial overhang extend respectively between two stator windings, immediately adjacent in a circumferential direction around the longitudinal centre axis and encased by the plastic injection moulded body. This means that one or each radial cooling aperture is bordered in circumferential direction towards both sides as it were by stator windings. Thereby, the radial cooling apertures can be directed relatively closely past the stator windings, so that the cooling of the first and/or second axial overhang is improved.

Furthermore, the encased stator windings forming the first axial overhang can be formed by free wire ends of wire strands, which are encased by the plastic injection moulded body. The free wire ends of the wire strands are combined here into a plurality of separate contact groups of respectively several free wire ends, wherein the free wire ends of the wire strands of such a contact group are connected with one another in an electrically conductive manner, in particular soldered or welded, and encased by the plastic injection moulded body and are thus electrically insulated with respect to the environment. Expediently, the free wire ends of such a contact group are stacked on one another, in a radially touching manner, with respect to the longitudinal centre axis. The contact groups are arranged spaced apart from one another in a circumferential direction around the longitudinal centre axis, so that a clear intermediate space is delimited between two immediately adjacent contact groups in circumferential direction, wherein the said radial cooling apertures in the first axial overhang are formed or delimited by precisely these clear intermediate spaces. The free wire ends are expediently not penetrated here. Thereby, a preferred embodiment is indicated, in which a relatively good cooling of the first axial overhang can be achieved.

Expediently, the encased stator windings in the second axial overhang are formed by bending portions of the previously explained wire strands, encased by the plastic injection moulded body. It can be at least imagined that the radial cooling apertures also or only penetrate the second axial overhang, in particular in the region of the plastic injection moulded body, so that the bending portions are expediently not penetrated here. Thereby also a relatively good cooling of the stator windings can be achieved in the region of the bending portions. Preferably, the radial cooling apertures penetrating the first axial overhang and the second axial overhang.

Further in particular, the radial cooling apertures can have, or be formed by, cooling ribs which are able to be flowed around by coolant. The cooling ribs can be arranged here in the cross-section of a radial cooling aperture which is able to be flowed through, and be able to be flowed around by coolant. It is also conceivable that the radial cooling apertures are realized by cooling ribs (i.e. hairpins welding area), wherein the cooling ribs are oriented axially away from the stator body and are expediently formed by encased stator windings. Thereby, the cooling surface via which thermal energy is transmitted from the stator to the coolant, can be enlarged. This has the advantageous effect that the achievable cooling performance is increased.

The stator can be distinguished in that the radial cooling apertures are embodied in a radially open manner. This can mean that the radial cooling apertures open out at a radial outer circumferential face of the first and/or of the second axial overhang with the formation of a radial outer orifice and at a radial inner circumferential face of the first and/or second axial overhang with the formation of a radial inner orifice. Thereby, the stator can be flowed through, or at least be able to be flowed through, by coolant from radially internally to radially externally, or vice versa, wherein the coolant flows in and flows out from the radial cooling apertures substantially orthogonally to the longitudinal centre axis. In particular, in connection with radial cooling apertures running radially with respect to the longitudinal centre axis, hereby a preferred configuration is produced, which is distinguished by a relatively high achievable cooling performance. Preferably, coolant flows through plurality of channels in stator slot (2 per slot), and channels between the stator housing and stator stack outer surface, wherein said channels are fluidically connected in parallel and serial connections, wherein the radial cooling apertures within the winding heads are used to promote the flow between these channels being in serial connection.

Furthermore, at least one radial cooling aperture can form a cooling tunnel. This can be delimited or bordered all around towards both sides in a circumferential direction around the longitudinal centre axis by the plastic injection moulded body and axially with respect to the longitudinal centre axis towards both sides by the plastic injection moulded body and radially open with respect to the longitudinal centre axis towards both sides. Thereby, cooling can flow in at one end, e.g. radially internally, into the cooling tunnel, and can flow out again at the other end, e.g. radially externally, or vice versa. A cooling tunnel in the sense of the invention can be interpreted as a cylindrical channel with any desired base faces, in particular a circular or oval-shaped base face, wherein its circumferential face is continuously closed and the base faces are open. As a corresponding cooling tunnel is bordered all around by the plastic injection moulded body, thermal energy can be transferred and evacuated relatively rapidly to the coolant from the first and/or second axial overhang, owing to the relatively large effective thermal transmission face. Preferably, the cross section shape of the radial cooling apertures and/or the cooling tunnel is essentially defined by the position of the bended wires within the overhang target area. Preferably, the thickness of plastic material is reduced to minimum, essentially the thickness of plastic being used for windings encapsulation, i.e. for the overmoulding of the stator, is below 2 mm, optionally below 0.5 mm.

It is, furthermore, expedient, if at least one radial cooling aperture forms a cooling slit. The latter can be delimited or bordered in a u-shaped manner towards both sides in a circumferential direction around the longitudinal centre axis by the plastic injection moulded body and axially with respect to the longitudinal centre axis on a side facing the stator body, and can be axially open with respect to the longitudinal centre axis radially towards both sides and on a side facing away from the stator body. Thereby, coolant, as in the cooling tunnel, can flow into the cooling tunnel at one end, e.g. radially internally, and can flow out again at the other end, e.g. radially externally, or vice versa, however additionally also can flow axially into the cooling slit or flow out. A cooling slit in the sense of the invention can be interpreted as a cylindrical channel with any desired base faces, in particular a circular or oval-shaped base face, the circumferential face of which towards one side and the base faces of which are open. As a corresponding cooling slit is bordered all around almost completely by the plastic injection moulded body, thermal energy can be transmitted from the first and/or second axial overhang relatively rapidly to the coolant and evacuated. A further advantage of cooling slits consists in that by the axial opening, plastic material is saved and the stator can be produced in a more lightweight manner. For instance, the said “cooling slits” are in function of heat sink cooling ribs, hence the axial winding head overhang (copper wires) is used in function of the heat sink for releasing the heat out of the windings, wherein thermal performance is dramatically improved.

Preferably, the said channels and said apertures are used to fluidically connect two set of channels being in serial connection. For instance, a first set of channels in slot (i.e. 48 parallel channels closer to the airgap) are connected to a second set of channels in slot (48 slots, closed to the yoke) by coolant flow, flowing over and through the winding head over-hang, wherein the hotspots in the axial winding head overhang are dramatically reduced by radial apertures within the axial overhang, which enables to coolant to flow through these areas.

Preferably, a coolant flow path is defined and limited by electric motor components (i.e. overmolded stator stack, housing or enclosure, end plates, and or additional flow barriers and deflectors as standalone components being used to guide the coolant flow through the electric motor cooling system).

It is furthermore expedient if the first axial overhang is divided into a partially ring-shaped power connection portion and into a partially ring-shaped counter-portion, adjacent in this respect in a circumferential direction around the longitudinal centre axis, or has such. There are associated with the power connection portion here three pin-shaped electric phase supply connections, which are embodied respectively aligned in a parallel manner with respect to the longitudinal centre axis, contacted electrically with the stator windings, encased by the plastic injection moulded body at least axially on the foot side with the formation of a foot base and with bare metal axially on the head side for an electric supply contacting. It is essential for the cooling capability of the stator, that several of the said cooling tunnels are associated with the power connection portion, which are arranged axially between the phase supply connections and/or the foot base and the stator body and penetrate the power connection portion radially. For example, the power connection portion is realised by a “star” or delta connection busbars for providing the target winding scheme arrangement. Furthermore, it is essential for the cooling capability of the stator that several cooling slits are associated with the counter-portion, which penetrate the counter-portion and are open radially and axially. Thereby, an advantageous embodiment is indicated, in which in particular the partial ring-shaped power connection portion with the phase supply connections can be cooled, which achieves thermal advantages in the operation of an electric machine equipped with the stator.

Viewed in a circumferential direction around the longitudinal centre axis, an angle of 3°, 4°, 5°, 6°, 7°, 8°, 9°, 10°, 15°, 20°, 25°, 30°, 35°, 40°, 45°, 90° or 180° can be spanned between two immediately adjacent cooling tunnels of the connection portion, furthermore a multiple of this angle can be spanned between the cooling tunnels of the connection portion which are adjacent in circumferential direction, and furthermore an angle of 180°, 170°, 160°, 150°, 140°, 130°, 120°, 110°, 100° or 90° can be spanned between the last two cooling tunnels of the connection portion furthest away with respect to one another viewed in circumferential direction. Here, matching opposite angles result for the cooling slits of the counter portion as follows: Viewed in a circumferential direction around the longitudinal centre axis, an angle of 3°, 4°, 5°, 6°, 7°, 8°, 9°, 10°, 15°, 20°, 25°, 30°, 35°, 40°, 45°, 90° or 180° can be spanned between two immediately adjacent cooling slits of the counter portion, furthermore a multiple of this angle can be spanned between the adjacent cooling slits of the counter portion in circumferential direction, and furthermore an angle of 180°, 190°, 200°, 210°, 220°, 230°, 240°, 250°, 260° or 270° can be spanned between the last two cooling slits of the counter portion arranged furthest away with respect to one another, viewed in circumferential direction.

Preferably, the stator has 36, 48, 54, 72 or more slots or cooling channels and/or cooling apertures, thus an angle between them would be equal to a ratio 360/36 or 360/48 or 360/54 or 360/72. Preferably, the said cooling channels and/or cooling apertures are arranged in the pattern corresponding to the number of the stator slots.

It is expedient if a fluid path for coolant is indicated, along which the stator is flowed through or able to be flowed through by coolant. Such a fluid path extends at least in sections axially along the longitudinal centre axis through the stator body and furthermore at least in sections radially with respect to the longitudinal centre axis through the radial cooling apertures through the first and/or second axial overhang, or vice versa. Thereby, a preferred fluid path for coolant is indicated, along which the stator is able to be flowed for its cooling.

The invention can comprise the alternative or additional further basic idea of indicating a production method for a stator according to the preceding description. It is distinguished by the following steps:

1) Providing a stator body, in particular a stator body blank or a stator stack comprising a core, which comprising a plurality of laminated blades;
2) Injecting a plastic insulator material, forming an insulating plastic injection moulded body, onto a bare radial inner circumference side of the stator body; Preferably, the first layer or shot is considered to be a "skin" of plastic material over target areas, in particular within the stator slot are, where solid copper wires (hairpins) are installed afterwards.
3) Arranging stator windings, for example solid conductors, well known as hairpins, I-pins, U pins, continuous wave winding, and phase supply connections on the stator body;
4) Injecting a plastic material, forming a plastic injection moulded body, onto the insulating plastic injection moulded body and the stator windings and phase supply connections for example a phase connection busbar, arranged on the stator body, whereby stator windings and phase supply connections are fixed on the stator body, and wherein at the same time the said radial cooling apertures are formed or introduced. Optional, in practice, a third shot of overmolding is used for sake of ensuring the required thickness of plastic insulation material over all critical areas, for instance the thickness between coper wires and coolant has to withstand required insulation breakdown. Preferably, the thickness of plastic insulation is dependent on selected material, wherein for preferable thermoset material with glass filler in size of 0.1 mm max particle size, is 0.25 mm. In practice this thickness is difficult to control, hence after the second shot, used for overmolding the wires and portion of the stator stack, the said third shot is preferably used to ensure the required thickness of plastic insulation material, also in the area of radial cooling apertures (channels).

Hereby, a favourably priced production method for such a stator is indicated, in which the radial cooling apertures are formed in an injection moulding step with the plastic injection moulded body.

Another basic idea of the invention, which is able to be realized additionally or alternatively to the basic ideas mentioned further above, can lie in indicating a use of a stator in an electric machine. Here, provision is made to construct a stator according to the preceding description and to integrate this into a machine housing of the electric machine, so that it can cooperate with a rotor of the electric machine. Hereby, a favourable use is indicated for such a stator.

In summary, it remains to be noted: The present invention preferably relates to a stator for an electric machine, with a ring-shaped stator body defining a longitudinal centre axis, on which stator body electrically conductive stator windings are fixed, with respect to the longitudinal centre axis encased radially internally by a plastic injection moulded body, extending along the longitudinal centre axis and projecting on both sides with respect to the longitudinal centre axis axially over the stator body, so that the stator body is axially flanked by a ring-shaped first axial overhang and a ring-shaped second axial overhang. It is essential that the stator has radial cooling apertures able to be flowed through by coolant, which radial cooling apertures completely penetrate the first and/or second axial overhang. The invention furthermore relates to a production method for such a stator and a use of such a stator in an electric machine. Optional, the windings are limited to hairpin type windings. For instance, with standard distributed windings the wires position is out of control, hence integration of cooling channels within the axial overhang would be extremely difficult. One of the key advantages of hairpin windings is, that the wires position is known exactly, thus position of the wires and thus also position of the busbars is well under control.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are represented in the drawings and are explained more closely in the following description, wherein the same reference numbers refer to identical or similar or functionally identical components.

BRIEF DESCRIPTION OF THE DRAWINGS

There are shown, respectively schematically

DETAILED DESCRIPTION

Figure 1:
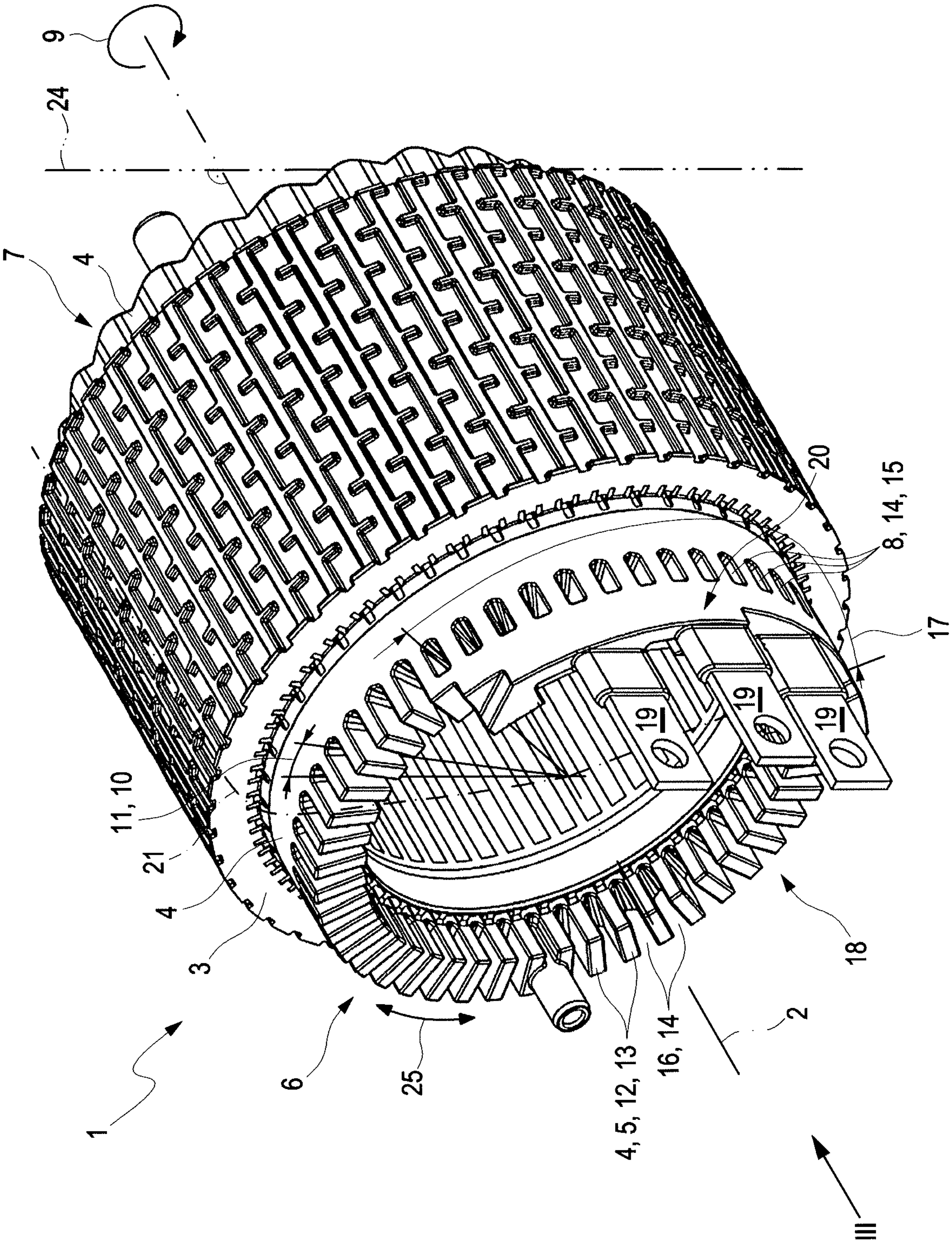
FIG. 1 a perspective view of a preferred example embodiment of a stator according to the invention, FIG. 2 as FIG. 1 a perspective view of the preferred example embodiment of the stator according to the invention, however an axial overhang of the stator is illustrated in a partially transparent manner, so that stator windings can be seen, and finally FIG. 3 in a top view, the stator of FIGS. 1 and 2 in the viewing direction of an arrow III drawn in FIG. 1.
Figure 2:
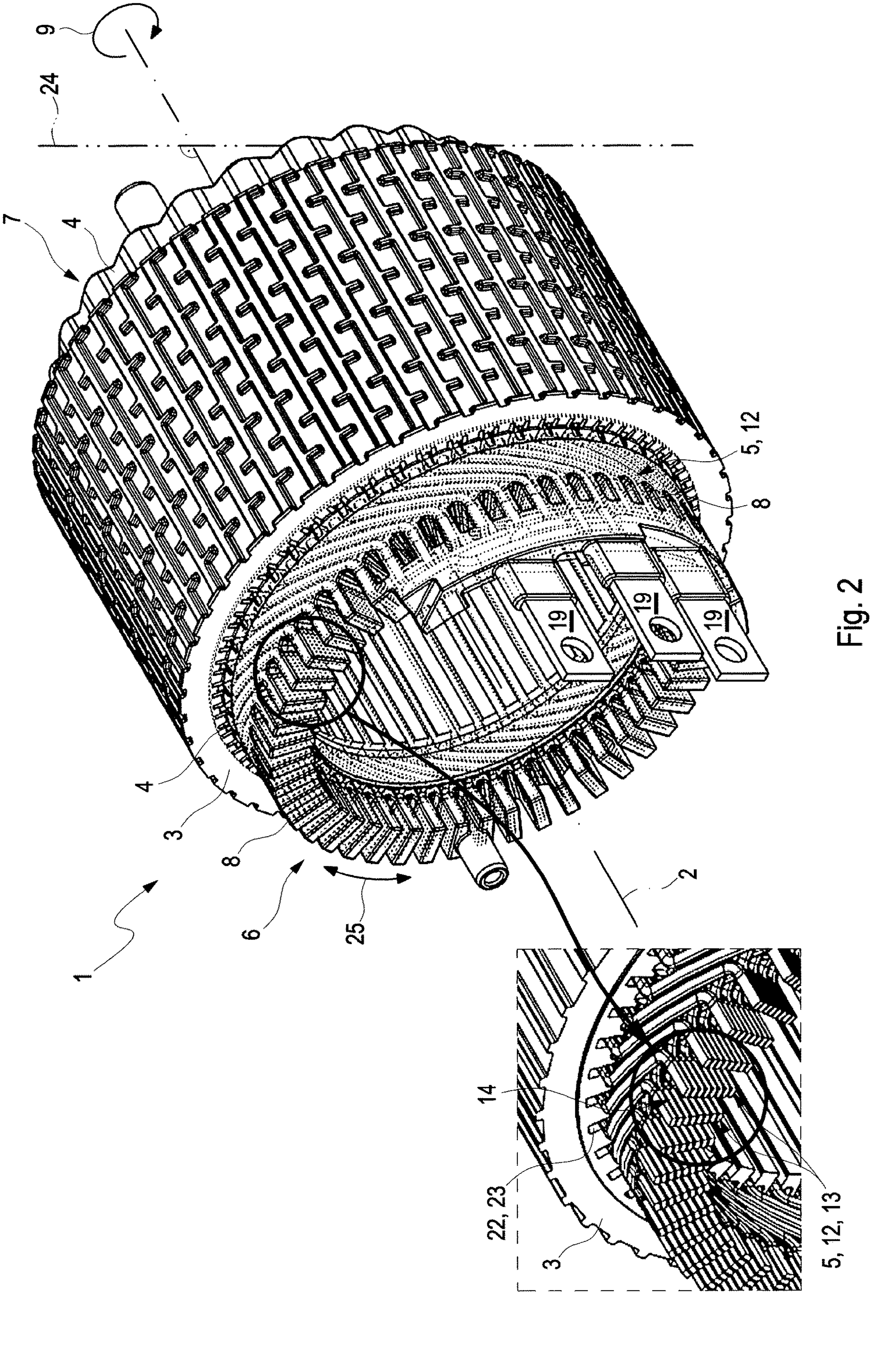
Figure 3:
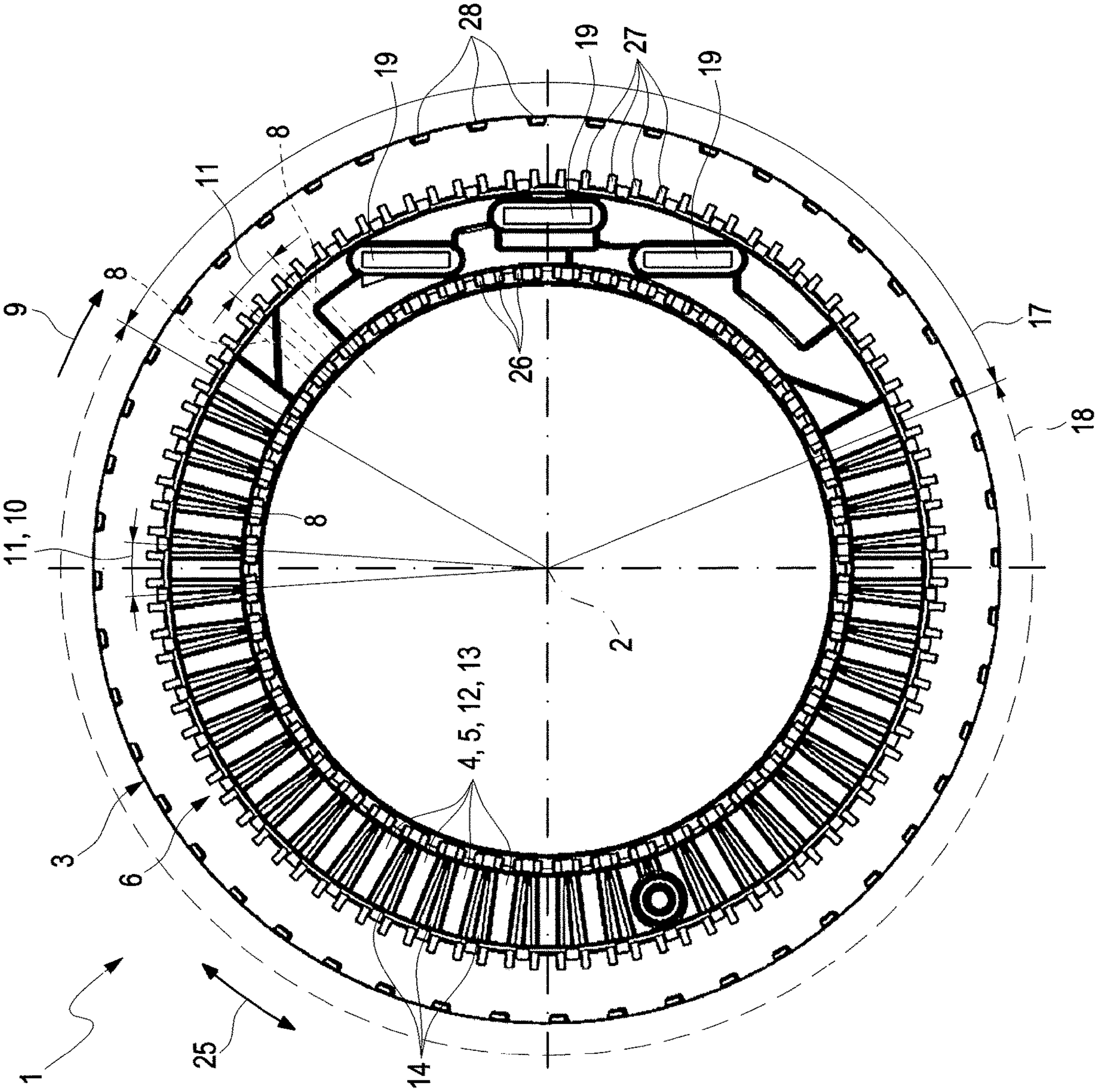

FIGS. 1 to 3 show a preferred example embodiment of a stator, designated as a whole by reference number 1, which can be integrated in an electric machine and can cooperate there with a rotor in operation of the electric machine. Here, in particular the stator 1 heats up, so that the electric machine or respectively the stator 1 must be cooled, for which in the present case radial cooling apertures 8, able to be flowed through by coolant, are provided.

In FIGS. 1 and 2 perspective views of a preferred example embodiment of a stator 1 according to the invention are illustrated. In FIG. 2 an axial overhang 6 of the stator 1, which is explained further below, is illustrated in a partially transparent manner, so that its inner workings can be seen. FIG. 2 shows these inner workings again in an enlarged view, bordered by a frame of dashed lines.

With reference to FIGS. 1 and 2, it is to be explained that the stator 1 has a ring-shaped stator body 3 which defines a longitudinal centre axis 2, which is indicated here by a dot-and-dash line. An insulating plastic injection moulded body 22 of plastic insulator material is injected on a, by way of example bare, radially internally lying inner circumference side 23 of the stator body 3, viewed with respect to the longitudinal centre axis 2, which inner circumference side cannot be seen in FIG. 1, however is indicated in FIG. 2 at least in the enlarged view. On this insulating plastic injection moulded body 22, electrically conductive stator windings 5 or coils are arranged, which can be produced from individual electrically conductive wire strands or hairpin wires or by a plurality of solid wires or conductors, not illustrated here, which are bent in a u-shaped manner. The wire strands have respectively two free wire ends 12 and, at the opposite end, a bending portion. Within the mounting of the stator windings 5 (I-pins, U-pins or wave winding, essentially all type of hairpins) these wire strands are inserted or respectively pushed in with their free wire ends 12 ahead into the stator body 3, so that the free wire ends 12 project axially with respect to the longitudinal centre axis 2 on one side of the stator body 3 and the said bending portions of the wire strands on the other side of the stator body 3. The free wire ends 12 are furthermore soldered or welded to one another, so that the separate wire strands are connected in an electrically conductive manner and form cohesive stator windings 5. Preferably, all type of hairpin windings 5 comprises at least phase connection busbars (and star or delta connection busbars), where bulk of material would dramatically increase the thermal hotspots in those areas, hence implemented cooling apertures within the winding heads improves thermal performance (and thus also continuous power) for e.g. more than 30%.

In order to insulate the stator windings 5 electrically and to fix them permanently on the stator body 3, the stator windings 5 are injected around completely with an injection moulding compound of plastic material, designated in the hardened state as plastic injection moulded body 4, whereby they are completely encased by way of example and are permanently fixed on the stator body 3. Here, the wire ends 12, which are encased by the plastic injection moulded body 4, are grouped into a plurality of contact groups 13. Each of these contact groups 13 has several electrically connected wire ends 12, stacked on one another in a radially touching manner, which, as mentioned, are encased by the plastic injection moulded body 4. The contact groups 13 are, furthermore, spaced apart with respect to one another in a circumferential direction 9 around the longitudinal centre axis 2, so that a clear intermediate space 14 is delimited between two immediately adjacent contact groups 13 in circumferential direction 9. The stator body 3, the stator windings 5 and the plastic injection moulded body 4 thereby preferably form an integral structural unit.

The free wire ends 12 and bending portions of the wire strands protruding axially over the stator body 3 are also completely encased by the plastic injection moulded body 4, so that, as can be seen in FIGS. 1 and 2, it can be stated that the encased stator windings 5 form ring-shaped overhangs on both sides of the stator body 3. For simpler designation, these are designed below as first axial overhang 6 and second axial overhang 7.

In order to be able to realize a relatively good cooling of the stator 1 in operation of an electric machine which is equipped with a stator 1 according to the invention, the above-mentioned radial cooling apertures 8, which are able to be flowed through by coolant, are provided in the area of the overmolded busbars and/or first axial overhang 6 and/or second axial overhang 7, which in the present case penetrate the first axial overhang 6 radially with respect to the longitudinal centre axis 2 or respectively in the direction of a vertical axis 24, standing perpendicularly on the longitudinal centre axis 2, which is indicated in FIGS. 1 and 2 respectively by a dash double dotted line. The radial cooling apertures 8 are therefore radially open, so that coolant can flow from radially internally to radially externally, or vice versa. Basically, it is of course conceivable that alternatively or additionally the second axial overhang 7, which is oriented opposed to the first axial overhang 6 axially, is equipped with such radial cooling apertures 8.

In FIG. 1 to 3 it can be seen that the said radial cooling apertures 8 are distributed in a circumferential direction 9 around the longitudinal centre axis 2 uniformly and with a uniform circumferential distance 10 with respect to one another in circumferential direction 9 over the entire circumference 25 of the first axial overhang 6, wherein each radial cooling aperture 8 is formed by or delimited by one of the said intermediate spaces 14. Thereby, the radial cooling apertures 8 are oriented radially with respect to the longitudinal centre axis 2 and extend respectively between two stator windings 5, adjacent in a circumferential direction 9 around the longitudinal centre axis 2 and encased by the plastic injection moulded body 4, wherein between two radial cooling apertures 8 immediately adjacent in circumferential direction 9, by way of example an angle 11 of 7.5° is spanned. Thereby, in operation of an electric machine equipped with the stator 1, an effective cooling can be realized. Preferably, the said cooling apertures 8 are integrated in space between the welding are of the hairpins and busbars, where otherwise would be a lot of bulk plastic material with low thermal conductivity. Hence hot spots in this area would limit the performance of electric motor. By implementing the said cooling apertures 8 in this particular area the performance is improved by e.g. more than 30%.

Furthermore, thereby a fluid path 21 for coolant is created, which is indicated in FIGS. 1 and 3 by a dotted line. The fluid path 21 extends axially along the longitudinal centre axis 2 through the entire stator body 3 and then radially with respect to the longitudinal centre axis 2 radially through the radial cooling apertures 8 from radially internally through the first axial overhang 6 to radially externally, or vice versa. Preferably, the key is, that radial cooling apertures 8 enables the flow of the coolant from the inner side to the outer side of the axial overhang 6, 7. Hence interconnecting a first set of channels 26 with a second set of channels 27 and/or a third set of channels 28 being in serial connection. The stator 1 preferably comprises all three channels 26, 27, 28. However, for some simplified embodiments, the second set of channels 27 could be avoided for sake of reducing the complexity of the tool being used for overmolding. Preferably, the radial cooling apertures 8 are used to provide a passage between at least two set of channels 26, 27, 28 in serial connection.

With reference to FIG. 1 it is to be explained in addition that the first axial overhang 6 is divided into a partial ring-shaped power connection portion 17 and into a partial ring-shaped counter-portion 18, adjacent in this respect in circumferential direction 9. The power connection portion 17 has three pin-shaped electric phase supply connections 19, which are embodied respectively aligned in a parallel manner with respect to the longitudinal centre axis 2, contacted electrically with the stator windings 5, encased by the plastic injection moulded body 4 at least axially at the foot side with the formation of a foot base 20, with busbars within, and with bare metal for an electric supply contacting, not illustrated here, axially at the head side. It can be seen that several radial cooling apertures 8 are associated with the power connection portion 17, which are realized as so-called cooling tunnels 15. These cooling tunnels 15 are distinguished in that respectively in the circumferential direction 9 towards both sides they are delimited or bordered all around by the plastic injection moulded body 4 and with respect to the longitudinal centre axis 2 axially towards both sides by the plastic injection moulded body 4, and are only open in radial direction. These cooling tunnels 15 are arranged axially between the phase supply connections 19 or respectively the foot base 20 and the stator body 3, and penetrate the power connection portion 17 radially completely. Preferably, the radial cooling apertures are arranged in the space between overmolded busbars (i.e. phase connections and star connection busbars) and between welded area of hairpin wires within the axial winding head overhang 6, 7. Thereby, this portion can be cooled relatively well. For example, if there are no cooling apertures, the hotspots in this area limiting the complete performance of the stator 1 or an electric motor comprising the stator 1. Furthermore, also several radial cooling apertures 8 are associated with the counter-portion 18, however these are realized as cooling slits 16. These cooling slits 16 are distinguished in that they are axially open on a side facing away from the stator body 3, and furthermore on both sides in the circumferential direction 9 are delimited or bordered by the plastic injection moulded body 4 and axially with respect to the longitudinal centre axis 2 on a side facing the stator body 3 by the plastic injection moulded body 4, whereby a u-shaped plastic injection moulded delimitation is produced.

The invention claimed is:

1. A stator for an electric machine, comprising:

a ring-shaped stator body defining a longitudinal centre axis;

a plurality of electrically conductive stator windings fixed radially internally on the stator body with respect to the longitudinal centre axis, the plurality of stator windings encased by a plastic injection moulded body, the plurality of stator windings projecting on both sides with respect to the longitudinal centre axis axially beyond the stator body such that the stator body is flanked axially on a first side by a ring-shaped first axial overhang and on a second side by a ring-shaped second axial overhang; and a plurality of radial cooling apertures through which coolant is flowable and which penetrate at least one of the first axial overhang and the second axial overhang.

2. The stator according to claim 1, wherein the plurality of radial cooling apertures penetrate the at least one of the first axial overhang and the second axial overhang with respect to the longitudinal centre axis at least one of radially and in a direction of a vertical axis extending perpendicularly to the longitudinal centre axis.

3. The stator according to claim 1, wherein the plurality of radial cooling apertures are distributed in a circumferential direction around the longitudinal centre axis at least one of uniformly and with a uniform circumferential distance with respect to one another in the circumferential direction over an entire circumference of the at least one of the first axial overhang and the second axial overhang.

4. The stator according to claim 1, wherein:

the plurality of radial cooling apertures are arranged adjacent to one another in a circumferential direction around the longitudinal centre axis; and between two immediately adjacent radial cooling apertures of the plurality of radial cooling apertures in the circumferential direction, at least one of a predetermined and a predeterminable angle is spanned.

5. The stator according to claim 1, wherein the plurality of radial cooling apertures disposed in the at least one of the first axial overhang and the second axial overhang extend respectively between two adjacent stator windings of the plurality of stator windings, encased by the plastic injection moulded body, in a circumferential direction around the longitudinal centre axis.

6. The stator according to, claim 1, wherein:

the encased plurality of stator windings forming the first axial overhang are formed by a plurality of free wire ends, encased by the plastic injection moulded body, of a plurality of wire strands forming the plurality of stator windings;

the plurality of free wire ends are combined into a plurality of contact groups each including a subset of the plurality of free wire ends;

the subset of the plurality of free wire ends of a contact group of the plurality of contact groups are connected to one another in an electrically conductive manner and are electrically insulated by the encasing plastic injection moulded body;

the plurality of contact groups are arranged spaced apart with respect to one another in a circumferential direction around the longitudinal centre axis such that a plurality of clear intermediate spaces are delimited by the plurality of contact groups;

each clear intermediate space of the plurality of clear intermediate spaces is delimited between two adjacent contact groups of the plurality of contact groups in circumferential direction; and the plurality of clear intermediate spaces form the plurality of radial cooling apertures.

7. The stator according to claim 1, wherein the plurality of radial cooling apertures at least one of i) include and ii) are formed by a plurality of cooling ribs around which the coolant is flowable.

8. The stator according to claim 1, wherein the plurality of radial cooling apertures are radially open.

9. The stator according to claim 8, wherein at least one radial cooling aperture of the plurality of radial cooling apertures forms a cooling tunnel that is at least one of delimited and bordered all around by the plastic injection moulded body and that is radially open.

10. The stator according to claim 8, wherein at least one radial cooling aperture of the plurality of radial cooling apertures forms a cooling slit that is delimited by the plastic injection moulded body in a u-shaped manner, is open radially, and is open axially on a side facing away from the stator body.

11. The stator according to claim 1, further comprising a plurality of cooling tunnels and a plurality of cooling slits, wherein:

the plurality of cooling tunnels are each formed by a respective radial cooling aperture of the plurality of radial cooling apertures, delimited by the plastic injection moulded body, and radially open;

the plurality of cooling slits are each formed by a respective radial cooling aperture of the plurality of radial cooling apertures, delimited by the plastic injection moulded body in a u-shaped manner, open radially, and open axially on a side facing away from the stator body;

the first axial overhang at least one of includes and forms a partial ring-shaped power connection portion and partial ring-shaped counter-portion arranged adjacent to the power connection portion in a circumferential direction around the longitudinal centre axis;

the power connection portion includes three pin-shaped electric phase supply connections that are respectively aligned in a parallel manner with respect to the longitudinal centre axis, contacted electrically with the plurality of stator windings, and embodied encased by the plastic injection moulded body at least axially at a foot side with a formation of a foot base and with bare metal axially at a head side for an electric supply contacting;

the plurality of cooling tunnels are associated with the power connection portion, are arranged axially between i) at least one of the three phase supply connections and the foot base and ii) the stator body, and penetrate the power connection portion radially; and the plurality of cooling slits are associated with the counter-portion, penetrate the counter-portion, and are radially and axially open.

12. The stator according to claim 1, further comprising a fluid path through which the coolant is flowable, wherein the fluid path extends at least in sections axially with respect to the longitudinal centre axis through the stator body and at least in sections radially with respect to the longitudinal centre axis in a radial manner through the plurality of radial cooling apertures.

13. A production method for the stator according to claim 1, comprising:

providing the stator body;

injecting a plastic insulator material, forming an insulating plastic injection moulded body onto a bare radial internal circumference side of the stator body;

arranging the plurality of stator windings and a plurality of phase supply connections on the stator body; and injecting a plastic material forming the plastic injection moulded body onto the insulating plastic injection moulded body, the plurality of stator windings, and the plurality of phase supply connections to fix the plurality of stator windings and the plurality of phase supply connections on the stator body and, at the same time, at least one of form and introduce the plurality of radial cooling apertures.

14. An electric machine, comprising the stator according to claims claim 1, a machine housing, and a rotor, wherein the stator is arranged in the machine housing and cooperates with the rotor.

15. A stator for an electric machine, comprising:

a ring-shaped stator body defining a longitudinal centre axis;

a plurality of electrically conductive stator windings disposed radially inside of the stator body and connected to the stator body, the plurality of stator windings projecting axially beyond the stator body at each axial end such that the stator body is flanked axially on a first side by a ring-shaped first axial overhang and on a second side by a ring-shaped second axial overhang;

a plastic injection moulded body at least partially encasing the plurality of electrically conductive stator windings; and a plurality of radial cooling apertures through which coolant is flowable, the plurality of radial cooling apertures penetrating at least one of the first axial overhang and the second axial overhang.

16. The stator according to claim 15, further comprising a plurality of cooling tunnels each of which is formed by a respective radial cooling aperture of the plurality of radial cooling apertures, delimited by the plastic injection moulded body, and radially open.

17. The stator according to claim 16, further comprising a plurality of cooling slits each of which is formed by a respective radial cooling aperture of the plurality of radial cooling apertures, delimited by the plastic injection moulded body in a u-shaped manner, open radially, and open axially on a side facing away from the stator body.

18. The stator according to claim 15, further comprising a plurality of cooling slits each of which is formed by a respective radial cooling aperture of the plurality of radial cooling apertures, delimited by the plastic injection moulded body in a u-shaped manner, open radially, and open axially on a side facing away from the stator body.

19. The stator according to claim 15, further comprising a fluid path through which the coolant is flowable, wherein the fluid path includes:

at least one first section extending axially through the stator body; and at least one second section extending radially outward through at least one of the plurality of radial cooling apertures.

20. A stator for an electric machine, comprising:

a ring-shaped stator body defining a longitudinal centre axis;

a plurality of electrically conductive stator windings arranged on an inner circumferential surface of the stator body, the plurality of stator windings projecting axially beyond the stator body at each axial end such that the stator body is flanked axially on a first side by a ring-shaped first axial overhang and on a second side by a ring-shaped second axial overhang;

a plastic injection moulded body at least partially encasing the plurality of stator windings and connecting the plurality of stator windings to the stator body;

a plurality of radial cooling apertures through which coolant is flowable, the plurality of radial cooling apertures penetrating at least one of the first axial overhang and the second axial overhang; and a fluid path through which the coolant is flowable, the fluid path including i) at least one first section extending axially through the stator body and ii) at least one second section extending radially through at least one of the plurality of radial cooling apertures;

wherein at least some of the plurality of radial cooling apertures are delimited by the plastic injection moulded body and are radially open.

* * * * *